United States Patent

Norman

[19]

[11] Patent Number: 6,131,764
[45] Date of Patent: Oct. 17, 2000

[54] WALL MOUNTED COFFEE FILTER DISPENSER

[76] Inventor: Michele F. Norman, 724 Wayne Ave., Reading, Pa. 19611

[21] Appl. No.: 09/293,808

[22] Filed: Apr. 19, 1999

[51] Int. Cl.⁷ .................................................... B65H 1/00
[52] U.S. Cl. ................................ 221/45; 221/59; 221/62; 206/449; 206/555
[58] Field of Search .................................. 221/45, 61, 62, 221/59, 60; 206/555, 449; 248/905; D6/515

[56] References Cited

U.S. PATENT DOCUMENTS

| | | | |
|---|---|---|---|
| 2,358,709 | 9/1944 | Hayn | 221/61 |
| 2,619,398 | 11/1952 | Kenmotsu | 221/59 |
| 2,981,408 | 4/1961 | Gamble | 206/555 |
| 4,619,766 | 10/1986 | Smiley et al. | 206/804 |
| 4,674,635 | 6/1987 | Huldin et al. | 206/555 |
| 4,805,801 | 2/1989 | Knopf | 221/210 |
| 5,695,065 | 12/1997 | Kennedy et al. | 221/45 |

*Primary Examiner*—H. Grant Skaggs
*Attorney, Agent, or Firm*—Richard O. Church

[57] ABSTRACT

A wall mounted closed container for storing and dispensing single coffee filters one at a time from a stacked nest of basket type coffee filters. The container has top and a bottom hinged cover plates to provide access to the container. The top cover plate has an interior spring clip that, in cooperation with a friction block mounted on the inside of the container, are adapted to grip a nest of basket coffee filters and retain the filters in a doubled over orientation with respect to each other when the top cover plate is in a closed position. The lower cover plate may be opened to provide access to the ends of the doubled over coffee filters as by grasping with ones fingers.

4 Claims, 4 Drawing Sheets

WALL MOUNTED COFFEE FILTER DISPENSER

FIELD OF THE INVENTION

The present invention relates to dispensers for thin sheet like articles and, more particularly, to a device for dispensing nested coffee filters one at a time.

BACKGROUND OF THE INVENTION

The most popular coffee making machines in use today are the drip coffee makers. A drip coffee maker conventionally has a filter support that is held positioned above a coffee pot. A filter shaped to conform to the inside dimensions of the filter support is inserted into the basket and fresh ground coffee is measured into the filter. Hot water is introduced above the filter, the hot water percolates downwardly through the fresh ground coffee and hot coffee is collected and discharged into a coffee pot.

The filters used with drip coffee pots are of two basic types. They are essentially either cone shaped with the lower end of the cone designed to be inserted down into the filter support or they are of a basket type that have flat bottoms and fluted side walls. Both types of filters are open at their upper ends to provide access for adding fresh grounds coffee and hot water. This invention is concerned only with drip coffee makers of the basket type and, more particularly, it relates to containers for storing and dispensing basket coffee filters.

Basket-type coffee filters are packaged for sale in nested, tightly compacted stacks. The basket filters conventionally are cut from a stack of flat filter papers and the flat stack is then configured into the form of a plurality of baskets with fluted side walls. In the cutting and forming operations the individual filters in a stack become enmeshed with adjacent filters at their cut edges often making it difficult to separate one filter from the next. Many people, especially the elderly and those who have lost some of the tactile sense in their fingers, find it difficult to separate and remove a single filter from the nested stack. Often several filters stick together when removed from the stack and they too must be separated from each other.

Suppliers of filters recognize that separating filters is, at best, a bothersome task and have tried to make the process easier. Some of them have provided low cost plastic tweezers with rubber or plastic tips as a bonus in a filter package. The innermost of the nested filters can be grasped by the tweezers and removed from the stack. Other filter manufacturers supply a cardboard tab coated on one side with a sticky substance that can grasp the uppermost filter for removal.

Other devices have been proposed to make it easier to separate nested coffee filters. Some of them utilize an articulated finger with a high friction surface at its end. The finger may be mounted on the under side of a hinged lid of a container and, when the lid is opened, the articulated finger engages the inside surface of the top filter paper and detaches it from the stack. Two examples of this type are illustrated in U.S. Pat. Nos. 5,197,630 and 5,687,876. The former patent is of interest since it contains a short bibliography of the patents of the prior art that deal with this problem. The latter of the two patents demonstrates the potential complexity of using an articulated finger since, it is noted, drawings with thirty-one figures were required to show the details of the patented device.

U.S. Pat. No. 4,874,112 is noteworthy for its simplicity. The patent teaches that the outside edges of the filters can be splayed out by folding a stack inside out and then returning the stack to its original configuration. The geometry of this movement cause the filters to move relative to each other when the stack is flexed making it easier to grasp an individual filter.

U.S. Pat. No. 4,674,635 shows an apparatus for securing coffee filters when they are folded over approximately along a diameter of the stack of filters. The folded filter stack is clamped in this position by a weighted and spring loaded hold down plate. The device apparently suffers from lack of reliability as evidenced by the suggestion that rubber bands may be used to retain the position of the elements should the springs fail.

OBJECTS OF THE INVENTION

Accordingly, it is the object of this invention to provide methods and means whereby basket type coffee filters may be easily and safely removed one at a time form a stack of filters.

Another object of this invention is to provide a wall mounted device for storing and removing basket type coffee filters.

A further object of the invention is to provide a simple device for storing and dispensing basket type coffee filters that is always readily at hand but does not require the use of counter space.

BRIEF DESCRIPTION OF THE DRAWINGS

In the drawings the same numerals are used in each Fig. to denote the same elements.

DETAILED DESCRIPTION OF THE DRAWINGS

Figure 1:
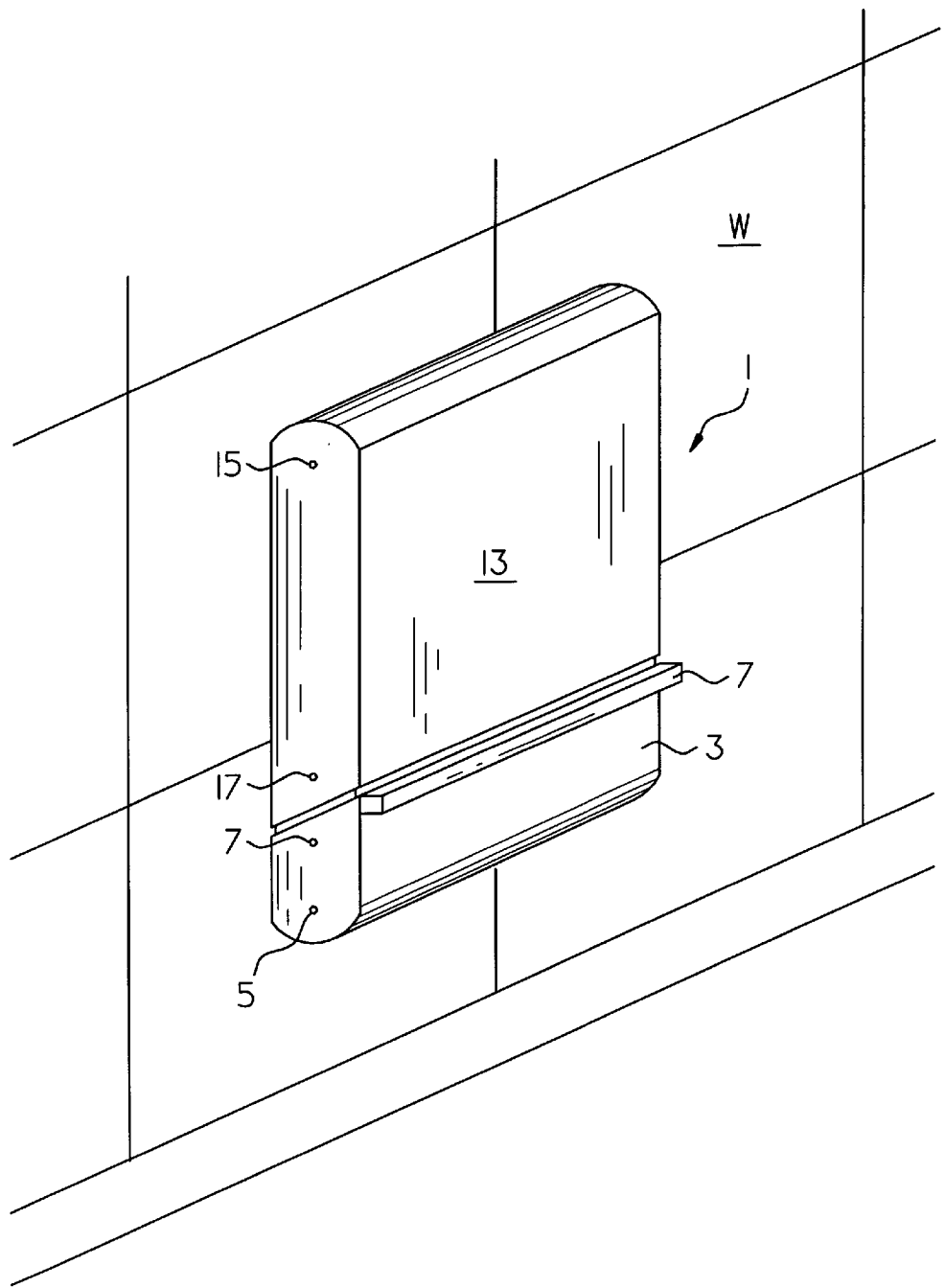
FIG. 1 is a perspective view of the device of this invention as mounted on a kitchen wall.
Figure 2:
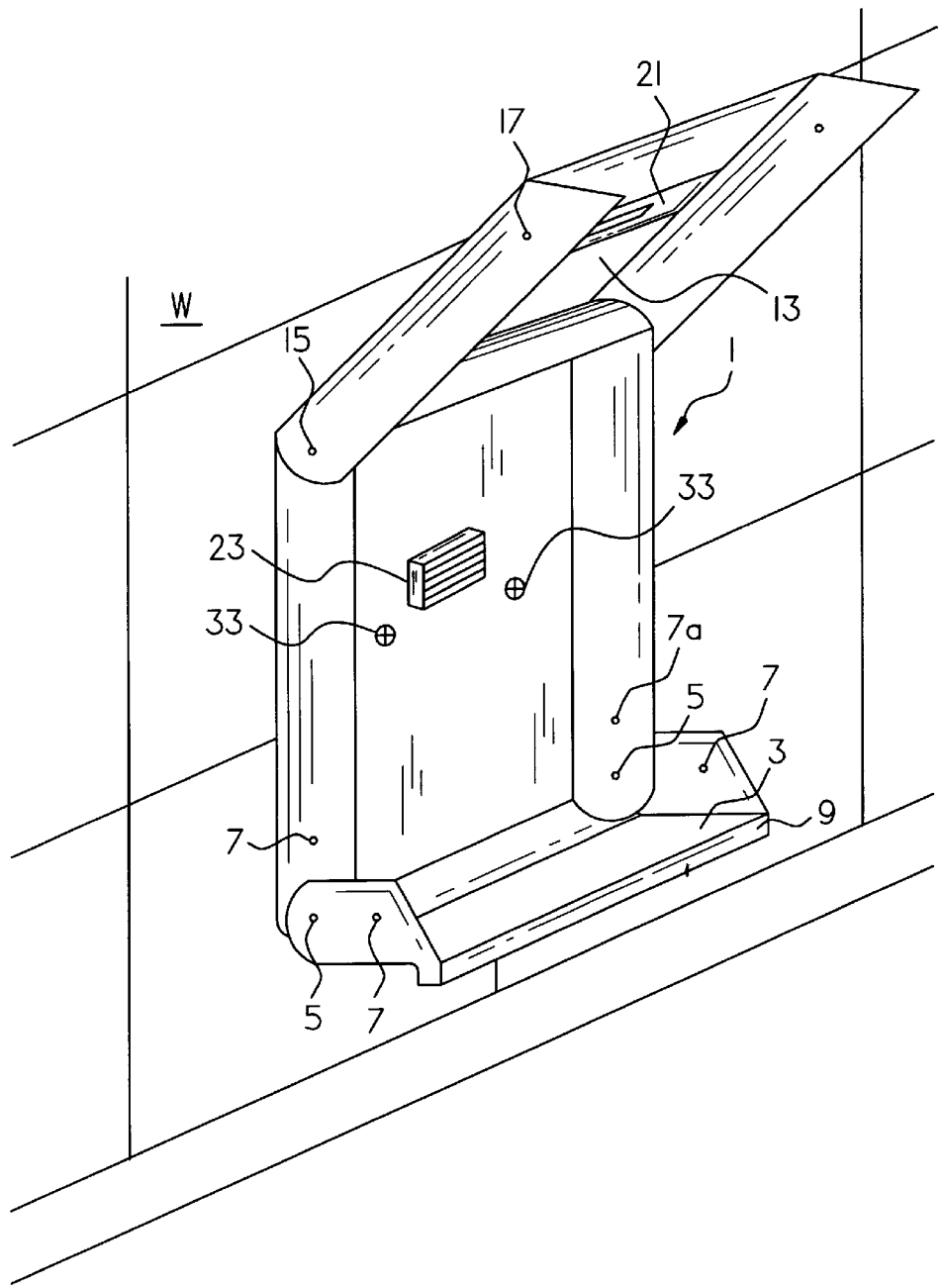
FIG. 2 is a perspective view of the device of the invention in a fully open position ready to receive a stack of filters.
Figure 3:
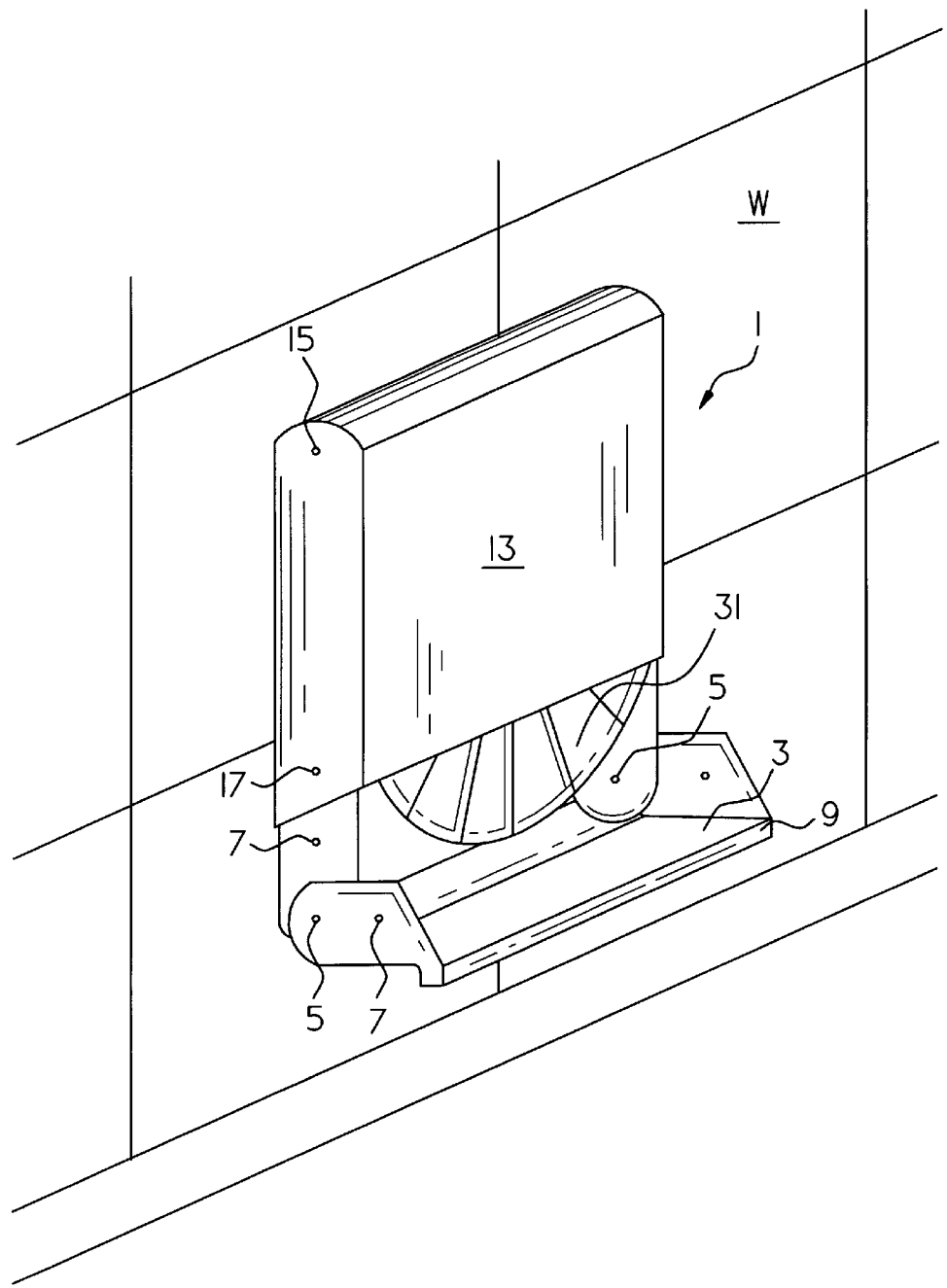
FIG. 3 is a perspective view of the device of the invention illustrating the location of the basket filters when the device is opened to remove a filter.
Figure 4:
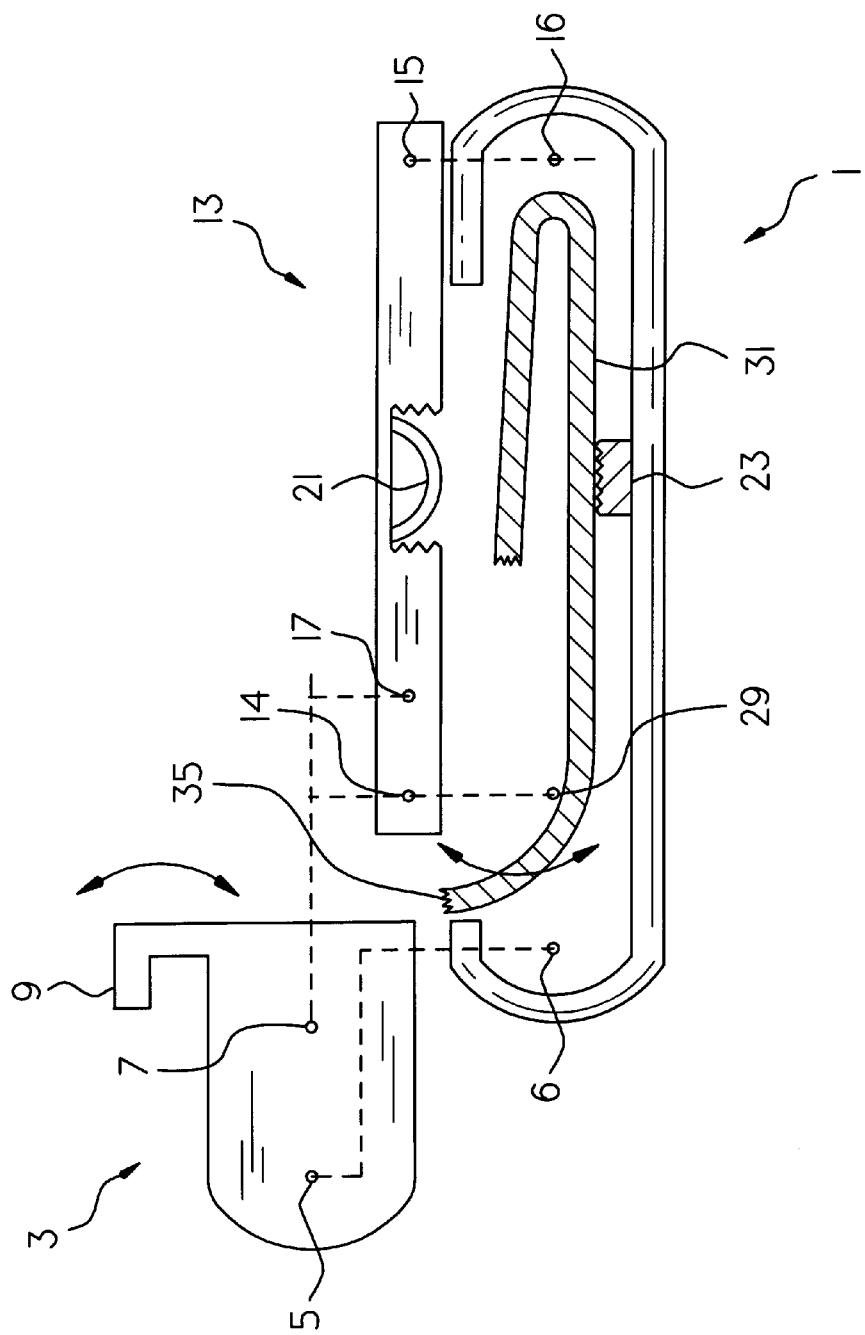
FIG. 4 is an exploded view in side elevation and partially in section illustrating the storage and dispenser of the invention.

In the Figs there is generally illustrated a housing 1 of the device of this invention as mounted on a wall W and secured by screw fasteners 33. The housing 1 supports a lower hinged cover 3 and an upper hinged cover 13. The lower hinged cover 3 contains an opening 5 that is aligned with opening 6 in the housing that permits them to be linked together by a hinge pin (not shown) extending form one side of the housing 1 to the other side. Similarly, the upper hinged cover 13 has an opening 15 aligned with an opening 16 in the housing 1 that permits them to be linked together by a hinge pin (not shown) extending form one side of the housing 1 to the other side.

The lower cover 3 is provided with a lip or finger hold 9. As indicated by the arrow in FIG. 1, the lower hinged cover 3 is adapted to be rotated around the hinge pin 6.

The forward edge of the upper hinged cover 13 has a pair of detents 17 an 19. The detents 17 are adapted to fit within the holes 7 of the lower hinged cover 3 to releasably hold the lower cover 3 in a closed position. Detent 19 is adapted to fit within a hole 29 in upper hinged cover 13 of the housing 1 so that the upper hinged cover 13 may be releasably secured to the housing 1.

A portion of the upper hinged cover 13, as shown in the drawing, has been partially cut away to illustrate a clip spring 21 that is mounted on the underside of the upper cover 13. A gripping element 23, which most conveniently can be made from a rubber or plastic, is mounted in the aligned center of the clip spring 21.

In operation, both the lower 3 and upper 13 hinged covers are rotated into a fully open position to provide unobstructed access to the interior of the housing 1 for the insertion of filters 35. A stack of basket type filter papers 31 are folded over along a diameter of the filters to position the sides of the innermost filter adjacent to each other. By so folding the filters over on themselves, the geometry stack forces the several filters of the stack to move relative to each other and cause the ends 35 to flail or fan out. While the filters 31 are held in this position the hinged cover 13 is closed securely holding the folded filters 31 between the spring clip 21 and the gripping element on the wall plate housing 23. While secured in this position the upper portion of the compressed filters 31 are oriented to flay out at an opening 35 in the housing 1 at a position between the upper hinged cover 13 and the lower hinged cover 3. The hinged lower cover 3 may be rotated into a position seated on the upper hinged cover 13 by the cooperation of the hole 7 in the lower cover 3 and the detent 17 in the upper hinged cover 13. When in this position, the device is fully closed and the filters contained within the device are protected from dirt, water spills and the like.

When it is desired to remove a filter for use in making a pot of coffee, the lower cover 3 is rotated around hinge pin 6 to expose the flayed ends 35 of the filters 31 making it an easy task to grip and pull a filter from the stack of filters 31 and drawn a filter 31 out of the holder.

It is to be noted that the holder and dispenser of this invention can, as illustrated in the drawings, be fixedly positioned against a wall as with the use of screw fasteners. This is generally a preferred manner of installing the filter holder as compared with other fastening devices such as suction cups. As is known, suction cups lose their ability to cling to a surface over an extended period of time and can present a safety hazard if they unexpected allow the filter to fall onto a person's hand or a breakable object on a kitchen counter.

What is claimed is:

1. A device for storing and dispensing coffee filters from a nested array of basket filters comprising:

a rectilinear base plate adapted to be mounted on a flat surface;

upstanding side members attached to the periphery of the base plate to define an open receptacle;

a first rectilinear cover plate pivotally mounted along one of its sides to a first side member;

a second rectilinear cover plate pivotally mounted along one of its sides to a second side member, the first and the second side members attached to opposite sides of the base plate;

the first and second cover plates being adapted to pivot into a closed position in which the cover plates meet at their free ends to enclose the receptacle and when pivoted in an opposite direction to provide free access to the receptacle;

a spring clip mounted on the lower surface of the first cover plate;

a friction block mounted on the inside surface of the base plate in registry with the spring clip mounted on the first cover plate;

the spring clip and the friction block being adapted to grip a nest of basket coffee filters and retain the filters in a doubled over orientation with respect to each other when the first cover plate is in a closed position; and the second cover plate providing access to the ends of the doubled over coffee filters when it is rotated into an open position.

2. A device according to claim 1 in which the rectilinear base plate is vertically mounted on the surface of a wall.

3. A device according to claim 2 in which the first cover plate is mounted at the top of the base plate and the second cover plate is mounted at the bottom of the base plate.

4. A device according to claim 2 in which the base plate is fixedly attached to the wall by means of permanent fastening devices.

* * * * *